(12) United States Patent
Montoya

(10) Patent No.: US 7,273,020 B2
(45) Date of Patent: Sep. 25, 2007

(54) TWO-WAY AQUARIUM FEEDER WITH SUCTION CUP ADAPTER

(76) Inventor: Ryan P. Montoya, 863 W. Montvale Ave., Flagstaff, AZ (US) 86001

( * ) Notice: Subject to any disclaimer, the term of this patent is extended or adjusted under 35 U.S.C. 154(b) by 0 days.

(21) Appl. No.: 11/134,331

(22) Filed: May 23, 2005

(65) Prior Publication Data

US 2006/0260552 A1    Nov. 23, 2006

(51) Int. Cl.
*A01K 61/02* (2006.01)
*A01K 63/00* (2006.01)
(52) U.S. Cl. .............. 119/51.04; 119/245; 119/256
(58) Field of Classification Search .......... 119/51.01, 119/51.05, 51.03, 57.8, 230, 210, 212, 221, 119/242, 246, 247, 245, 253, 256, 269, 51.04, 119/61.5, 61.3, 57.4, 61.57; D30/106, 104, D30/101, 121; 47/69, 41.01–41.15; 40/658, 40/652, 647, 660, 667, 597; 24/514, 67.1; 220/574, 27.8, 574.1; 248/452, 453, 309.7, 248/310; 16/403, 404; 428/99; *A01K 61/02*
See application file for complete search history.

(56) References Cited

U.S. PATENT DOCUMENTS

| | | | | |
|---|---|---|---|---|
| 2,046,854 A * | 7/1936 | Simpson | ............ | 47/41.13 |
| 2,142,825 A * | 1/1939 | Patten | ............ | 119/51.03 |
| 2,718,211 A * | 9/1955 | Pettas | ............ | 119/51.04 |
| 2,984,208 A * | 5/1961 | Kopietz | ............ | 119/51.03 |
| 3,562,952 A * | 2/1971 | Bramante | ............ | 47/44 |
| D224,031 S * | 6/1972 | Willinger | ............ | D11/146 |
| 4,185,743 A * | 1/1980 | Willinger | ............ | 206/423 |
| 4,340,625 A * | 7/1982 | Willinger | ............ | 428/17 |
| 4,716,855 A * | 1/1988 | Andersson et al. | ...... | 119/61.54 |
| 5,365,884 A * | 11/1994 | Jones | ............ | 119/256 |
| 5,722,347 A * | 3/1998 | Tominaga et al. | .......... | 119/253 |
| 5,806,459 A * | 9/1998 | Hayes | ............ | 119/57.8 |
| 5,855,982 A * | 1/1999 | Wechsler | ............ | 428/99 |
| 5,857,430 A * | 1/1999 | Griffiths | ............ | 119/256 |
| 5,884,581 A * | 3/1999 | Vandaele | ............ | 119/52.4 |
| 6,237,532 B1 * | 5/2001 | Derr | ............ | 119/51.01 |
| 6,474,266 B1 * | 11/2002 | Arnett | ............ | 119/256 |
| 6,672,250 B1 * | 1/2004 | Traylor et al. | ............ | 119/256 |
| 2004/0112300 A1 * | 6/2004 | Heygen | ............ | 119/416 |
| 2006/0010768 A1 * | 1/2006 | Ramirez | ............ | 47/41.01 |

FOREIGN PATENT DOCUMENTS

DE         3736232 A1 *  5/1989
FR         2627052 A1 *  8/1989

* cited by examiner

*Primary Examiner*—Andrea Valenti
(74) *Attorney, Agent, or Firm*—Pillsbury Winthrop Shaw Pittman LLP

(57) ABSTRACT

A two-way feeder for use in an aquarium. The feeder has a base that can be buried in sand or crushed coral in an aquarium. One or more fittings on the underside of the base provides a user of the feeder with the option of applying one or more suction cups to the feeder. The suction cups are used to attach the feeder in different surfaces of the aquarium, including the bottom surface and the side walls. The feeder can be used as to attach food in at least two ways. First, buoyant foods such as cucumber can be secured to the top of the device by screwing the cucumber over the head of the threaded receiver. Second, leafy foods such as lettuce or seaweed can be secured by a spring clip associated with an adapter that is compatible with and screwed onto the threaded receiver.

15 Claims, 3 Drawing Sheets

TWO-WAY AQUARIUM FEEDER WITH SUCTION CUP ADAPTER

BACKGROUND

1. Field of the Invention

Embodiments of the present invention relate to a fish feeding device for use in aquariums. More particularly, embodiments of the present invention relate to the stationary securing of food for fish housed in aquariums.

2. Background of the Invention

Certain types of fish that are kept in aquariums require fresh vegetables for food, such as cucumber or leaf lettuce. Typically, a slice of cucumber or a piece of lettuce is placed in the aquarium. The buoyancy associated with such vegetables keeps them floating, which makes it difficult for the fish to eat. Accordingly, there is a need for a method or device that secures fish food below the water surface of an aquarium.

SUMMARY OF THE INVENTION

The preferred embodiment of the invention is a two-way feeder for use in an aquarium. The feeder is preferably made of a non-buoyant hard plastic type material. Preferably, the feeder has a cupped reservoir base that can be buried in sand or crushed coral in an aquarium. One or more fittings on the underside of the base provides a user of the feeder with the option of applying one or more suction cups to the feeder. The suction cups are used to attach the feeder in different surfaces of the aquarium, including the bottom surface and the side walls. The feeder can be used as to attach food in several ways. For example, buoyant foods such as cucumber can be secured to the top of the device by screwing the cucumber over the head of the threaded receiver. Another way to secure the food, e.g., a leaf lettuce or seaweed, is to use a spring clip adapter. The threaded receiver adapter is compatible with and screwed onto the threaded receiver. The adapter utilizes a spring clip which is affixed to the top of the adapter.

DETAILED DESCRIPTION OF A PREFERRED EMBODIMENT

The present invention provides a stationary mounting which allows food for fish housed in aquariums to be held in place using either the threaded receiver or a clip adapter. The present invention may be placed at the bottom of the aquarium and weighted down with crushed coral or may be placed on the side of the aquarium using one or more suction cups.

Generally, the preferred embodiment of the invention is a two-way fish feeder made of a hard non-buoyant plastic type material. The feeder base anchors the device to the bottom of the aquarium by being weighted down with sand or crushed coral in the cupped reservoir. A fitting on the underneath side of the base provides the user the option of applying a snap-fit suction cup to the feeder in order to utilize the feeder in various areas of the aquarium tank such as on the glass sides. The top of the device is a threaded receiver and is used as the feeder in one of two ways. Buoyant foods such as cucumber are secured to the top of the device by being screwed onto the threaded receiver. The second option is to use the spring clip adapter. The adapter body is compatible with and screwed onto the threaded receiver. The threaded receiver adapter utilizes a spring clip which is affixed to the top of the adapter. The spring clip holds a small piece of food such as lettuce or seaweed. Both options allow the fish to feed on the food as it is held in a stationary position.

Figure 1:
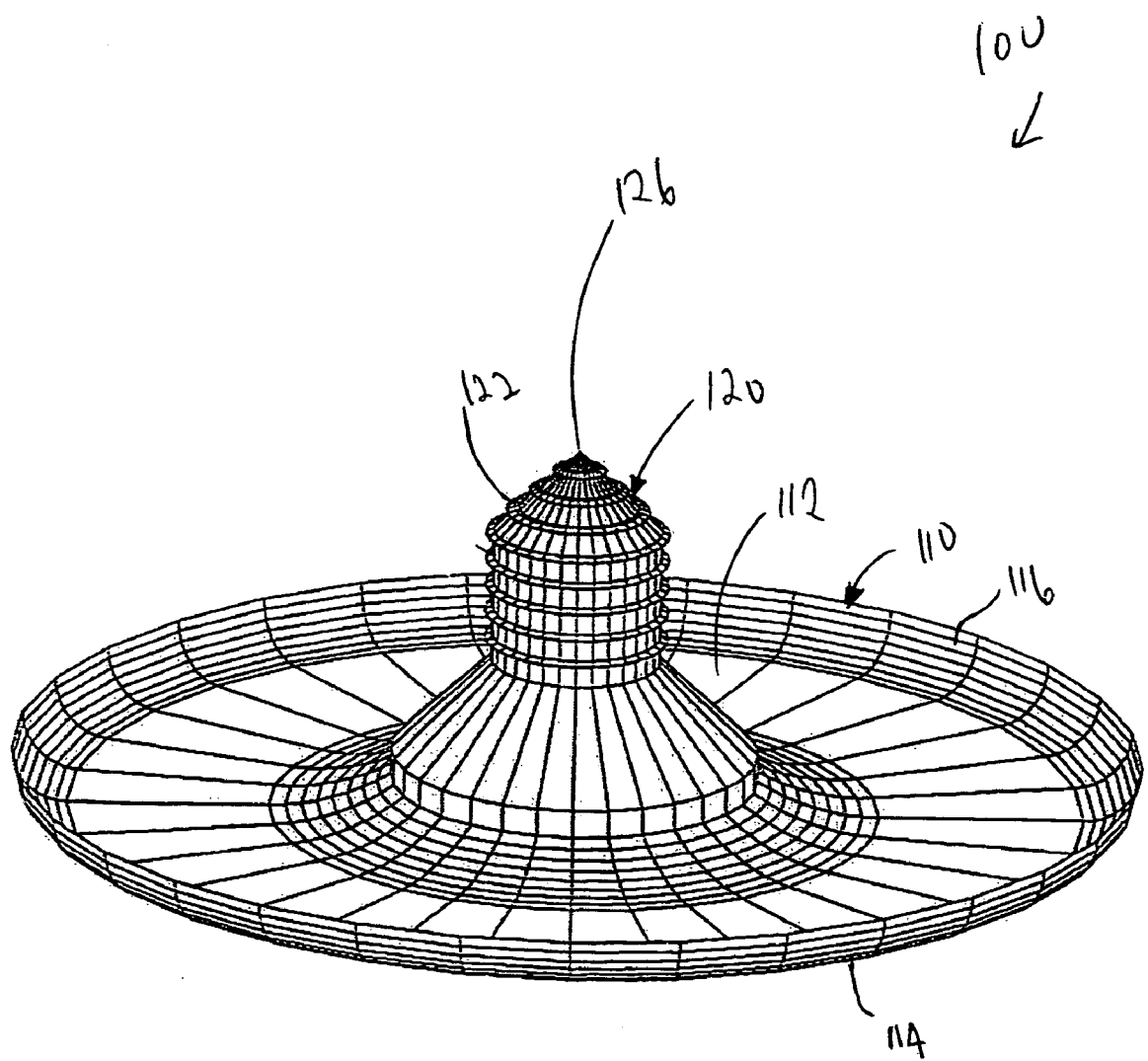
FIG. 1 is an isometric view of a preferred embodiment of the feeder of the invention.

FIG. 1 is an isometric view of a preferred embodiment of the feeder of the invention. Feeder 100 includes base 110 and receiver 120. Base 110 includes topside 112 and underside 114. Topside 112 is configured to retain weighted objects. For example, when used in an aquarium, sand, gravel, crushed coral, or other weighted object can be placed over topside 112 to secure feeder 100 to the bottom surface of the aquarium. Preferably, base 110 includes perimeter wall 116 that is configured to retain the weighted object within. Although base 110 is shown in FIG. 2 to have a circular shape footprint, base 110 can be configured to have other shapes for the footprint, including the shapes of an ellipse, triangle, or any regular or irregular shapes.

Receiver 120 is preferably located in the middle of base 110. However, Receiver 120 can be located anywhere within the footprint of base 110. Receiver 120 is coupled to topside 112 of base 110. Preferably, receiver 120 includes spiral thread 122 around outer surface of receiver 120. Receiver 120 preferably includes pointed tip 126, which is configured to facilitate insertion of Receiver 120 into a food item such as a cucumber.

Figure 3:
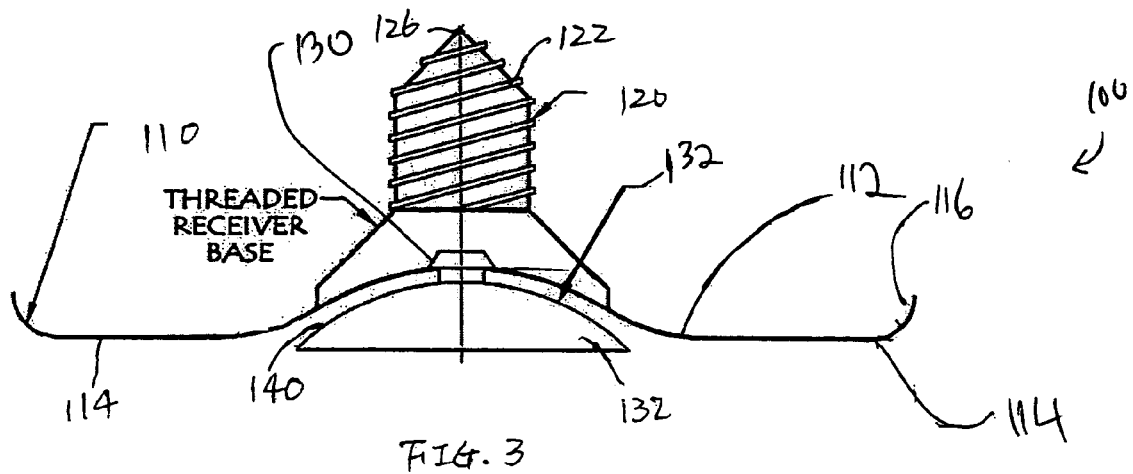
FIG. 3 is a cross-sectional view of the preferred embodiment shown in FIG. 2 along line A-A.
Figure 2:
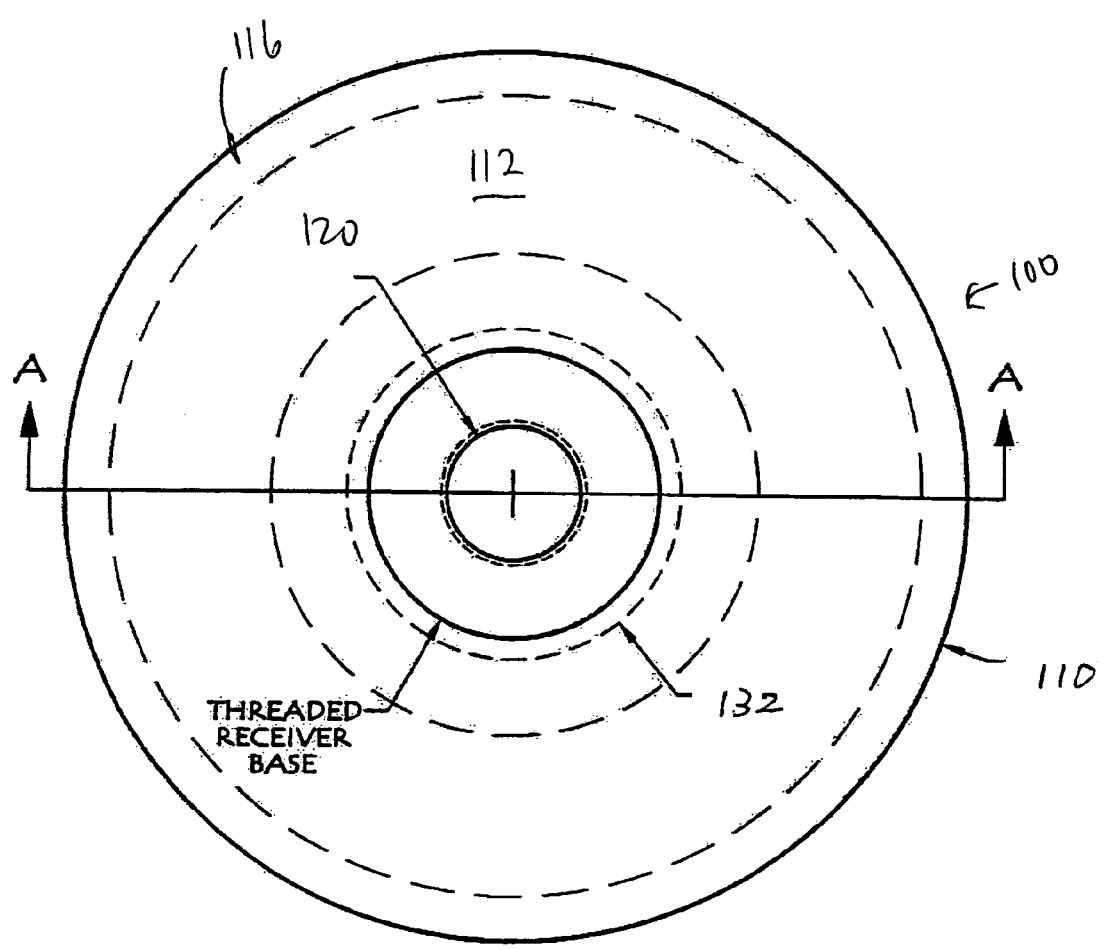
FIG. 2 is a plan view of the preferred embodiment shown in FIG. 1.

FIG. 3 is a cross-sectional view of the preferred embodiment shown in FIG. 2 along line A-A. As shown in FIG. 3, feeder 100 preferably includes at least one fitting 130 on underside 114 of base 110. Fitting 130 is configured to receive suction cup 132. Preferably, base 110 is configured to include concave portion 140 to accommodate suction cup 132.

Figure 4:
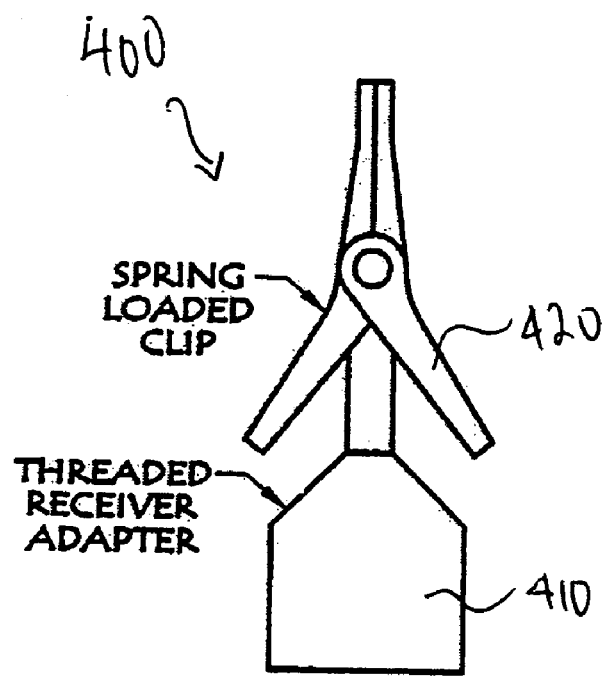
FIG. 4 is side view of a spring loaded clip adapter that is configured to couple with a threaded receiver of the preferred embodiment of the invention.
Figure 5:
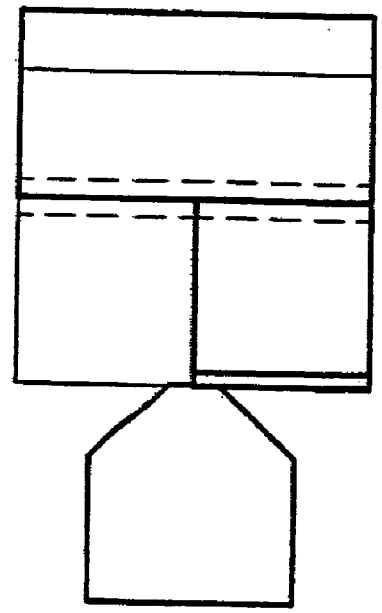
FIG. 5 is a front view of the spring loaded clip adapter shown in FIG. 4.

FIG. 4 is side view of adapter 400, which is preferably a spring loaded clip. FIG. 5 is a front view of adapter 400, which is configured to couple with receiver 120 of the preferred embodiment of the invention. Adapter 400 includes coupling portion 410 and clip 420. Coupling portion 410 preferably includes interior spiral thread that correspond with spiral thread 122, which is external to receiver 120. Clip 420 is configured to secure a food item, such as a piece of lettuce. Preferably, as indicated in FIGS. 4 and 5, clip 420 is a spring loaded clip.

Any or all of base 110, receiver 120, and adapter 400 can be made of plastic. Moreover, base 110 and receiver 120 can be an integrated unit or two separate unit coupled to each other.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. In a combination,
an aquarium;
a feeding device, comprising:
  a base having a reservoir cup that is configured to receive weighted objects to weigh down the feeding device in the aquarium, the reservoir cup having a peripheral rim defining an opening that faces a first direction; and
  a threaded receiver extending generally in the first direction from the base from within the reservoir cup, wherein the threaded receiver comprises a spiral thread around an outer surface of the threaded receiver; and
a detachable threaded receiver clip removably coupled with the threaded receiver, wherein the detachable threaded receiver clip comprises an adapter and a clip, the adapter comprises a second spiral thread around an inner surface of the adapter that couples with the first spiral thread, the clip is configured to secure an edible food item.

2. The combination of claim 1, wherein the base further comprises a fitting on an underside of the base, the fitting is configured to receive a suction cup.

3. The combination of claim 1, wherein the reservoir cup of the base has a circular shape.

4. The combination of claim 1, wherein the threaded receiver is located in the middle of the reservoir cup of the base.

5. The combination of claim 1, wherein the device is made of plastic.

6. In a combination,
an aquarium;
a feeding device, comprising:
  a base having a reservoir cup that is configured to receive weighted objects to weigh down the feeding device in the aquarium, the reservoir cup having a peripheral rim defining an opening that faces in a first direction;
  a fitting located on an underside of the reservoir cup of the base, wherein the fitting is configured to receive a suction cup that faces in a second direction; and
  a threaded receiver extending generally in the first direction from the base from within the reservoir cup, wherein the threaded receiver comprises a spiral thread around an outer surface of the threaded receiver; and
a detachable threaded receiver clip removably coupled with the threaded receiver, wherein the detachable threaded receiver clip comprises an adapter and a clip, the adapter comprises a second spiral thread around an inner surface of the adapter that couples with the first spiral thread, the clip is configured to secure an edible food item.

7. The combination of claim 6, wherein when the suction cup is applied to a surface of the aquarium, the bottom side of the base rests on the surface.

8. The combination of claim 6, wherein the threaded receiver comprises a pointed portion, wherein the spiral thread loops around the pointed portion.

9. The combination of claim 6, wherein the detachable threaded receiver clip is configured to directly secure the edible food item.

10. In a combination,
an aquarium;
a feeding device, comprising:
  a base having a reservoir cup that is configured to receive weighted objects to weigh down the feeding device in the aquarium, the reservoir cup having a peripheral rim defining an opening that faces in a first direction;
  at least one suction cup coupled to an underside of the reservoir cup of the base that faces in a second direction, wherein when the at least one suction cup is applied to a surface of the aquarium, the feeding device is secured on the surface by the suction cup;
  a threaded receiver extending generally in the first direction from the base from within the reservoir cup, wherein the threaded receiver comprises a first spiral thread around an outer surface of the threaded receiver; and
  a detachable threaded receiver clip removably coupled with the threaded receiver, wherein the detachable threaded receiver clip comprises an adapter and a clip, the adapter comprises a second spiral thread around an inner surface of the adapter that couples with the first spiral thread, the clip is configured to secure an edible food item.

11. The combination of claim 10, wherein the base of the feeding device has a circular shape.

12. The combination of claim 10, wherein the threaded receiver is located in the middle of the reservoir cup of the base.

13. The combination of claim 10, wherein the feeding device is made of plastic.

14. The combination of claim 10, wherein the threaded receiver comprises a pointed portion, and wherein the first spiral thread loops around the pointed portion.

15. The combination of claim 10, wherein the clip is a spring loaded clip.

* * * * *